(12) United States Patent
Chen

(10) Patent No.: US 6,373,643 B1
(45) Date of Patent: Apr. 16, 2002

(54) NAME CARD IMAGE OBTAINING DEVICE

(75) Inventor: Ming-Chih Chen, Chia-I (TW)

(73) Assignee: Shun-Tsai Huang, Taichung Hsien (TW)

( * ) Notice: Subject to any disclaimer, the term of this patent is extended or adjusted under 35 U.S.C. 154(b) by 0 days.

(21) Appl. No.: 09/703,637

(22) Filed: Nov. 2, 2000

(51) Int. Cl.[7] .............................................. G02B 27/02
(52) U.S. Cl. ....................................................... 359/804
(58) Field of Search .............................. 359/798, 801, 359/802, 804, 805, 806, 807

(56) References Cited

U.S. PATENT DOCUMENTS

| | | | | |
|---|---|---|---|---|
| 2,635,504 A | * | 4/1953 | Hawkins | 359/804 |
| 4,030,814 A | * | 6/1977 | Clifton et al. | 359/801 |
| 5,278,673 A | * | 1/1994 | Scapa et al. | 358/473 |
| 5,357,094 A | * | 10/1994 | Baldwin | 235/494 |
| 5,986,991 A | * | 11/1999 | Kawahara et al. | 369/75.1 |

* cited by examiner

*Primary Examiner*—Ricky Mack
(74) *Attorney, Agent, or Firm*—Rosenberg, Klein & Lee

(57) ABSTRACT

A name card image obtaining device mainly comprises a hollow housing, an image obtaining device and a name card holding device. The hollow housing has a first end and a second end. Several homogeneous light generating sections are disposed near the first end. The image obtaining device is disposed on the first end of the hollow housing. This image obtaining includes at least one connecting port. The name card holding device is disposed on the second end to hold a name card. So, its advantages include no light spot problem on the name card image, fixed focus with micro-adjustable focus mechanism and ease of inserting/drawing name card.

6 Claims, 6 Drawing Sheets

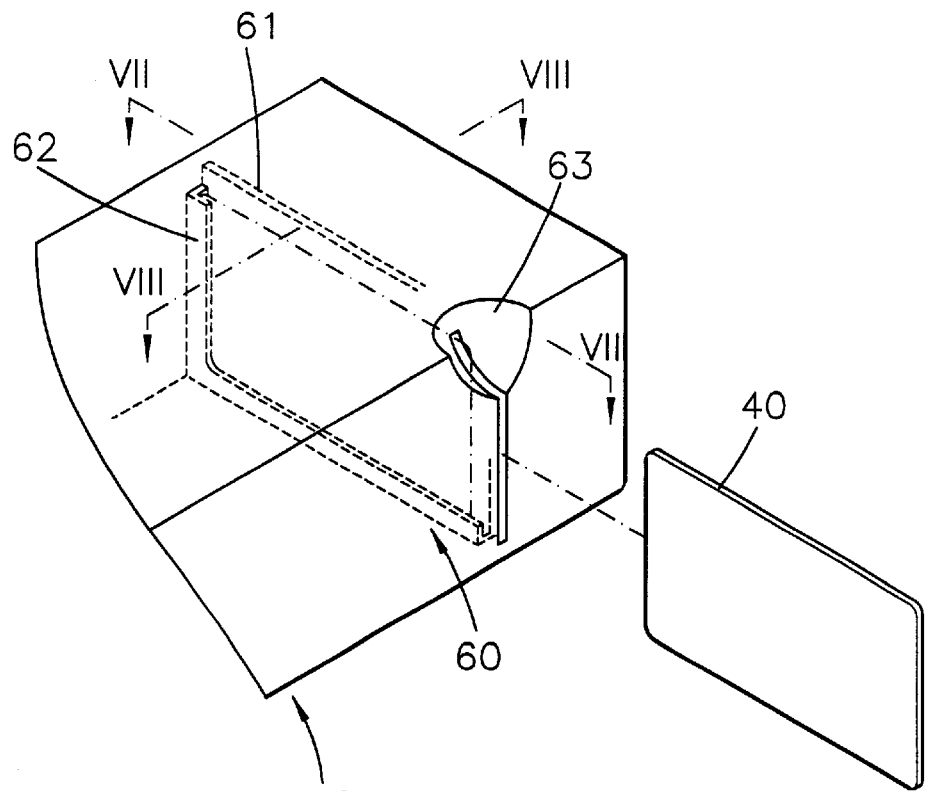
FIG. 6
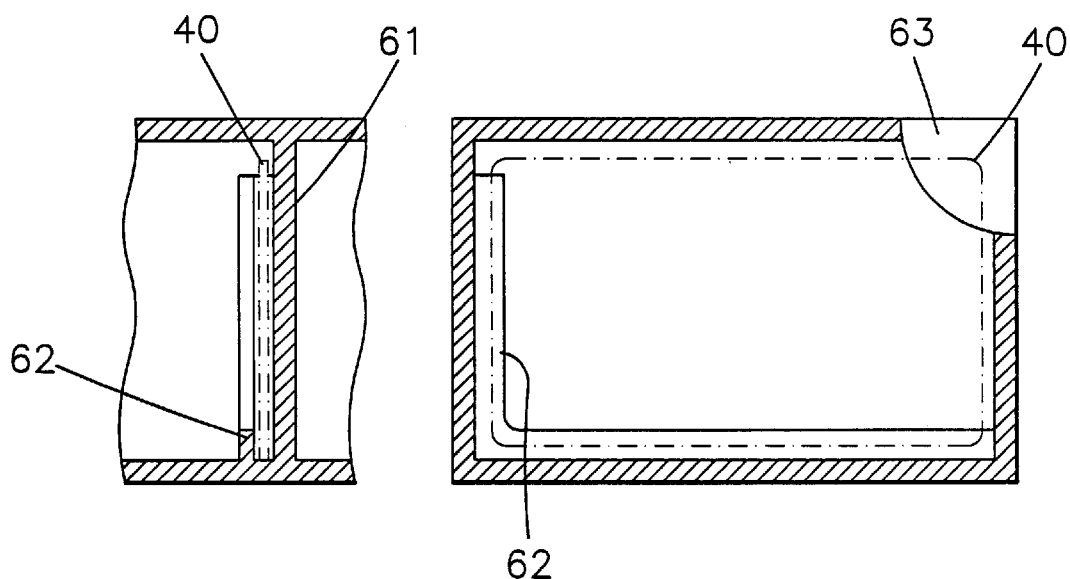
FIG. 8
FIG. 7

NAME CARD IMAGE OBTAINING DEVICE

BACKGROUND OF INVENTION

1. Field of the Invention

This invention is related to a name card image obtaining device, especially to a name card image obtaining device that has the advantages of no light spots problem on the name card image, fixed focus with micro-adjustable focus mechanism and ease of inserting/drawing name card.

2. Description of the Prior Art

As shown in FIG. 1, it illustrates the typical way to obtain a name card image by using a traditional digital camera 50. A user just holds on the digital camera 50 and then takes a picture from the name card 40. For example, if the user need to take ten images of ten name cards, he/she has to take ten pictures (10 times) respectively. After which, the user must transmit these name card image files from the digital camera 50 to a personal computer to do some post-processing. However, the disadvantages includes:

(1) The light source is unstable and will be easily influenced by other external light sources; and the flash lamp will cause some concentrated light spots on the name card image. Basically, the name card image is obtained in an indoor environment. The light source's location and brightness are easy to be interfered by other light sources. When the brightness of light is not enough, the user usually will use the flash lamp to enhance the image quality. However, because the surface of name card is smooth (easy to reflect light), there always are some concentrated light spots in the name card image. These light spots might block some information of the name card (such as name, address, phone number, etc.) and cause some portions of the name card information cannot be recognized or processed.

(2) The focus might be different and the operation is inconvenient. Usually, the user manually adjusts the distance (between the digital camera 50 and the name card 40) and direction. So, the distance and direction of first time shot and the distance and direction of the second time shot might be inconsistent. Therefore, the user needs to carefully adjust the correct focus and direction every time. Such adjusting is time-consuming and inconvenient.

SUMMARY OF THE INVENTION

The major object of the present invention is to provide a name card image obtaining device. By cleverly using the principle of reflecting light, this invention has a homogeneous light source so that there is no concentrated light spots in the name card image.

The second object of the present invention is to provide a name card image obtaining device. By utilizing the micro-adjustable focus mechanism, this invention will guarantee the focus and direction are precisely correct.

Another object of the present invention is to provide a name card image obtaining device. In which, the operation for inserting/drawing name card is easy.

Still another object of the present invention is to provide a name card image obtaining device. In which, this invention also has an auxiliary function for short-distance image obtaining.

BRIEF DESCRIPTION OF THE DRAWINGS

FIG. 6 shows the second preferred embodiment of this invention.

FIG. 7 shows a cross-sectional view of the second preferred embodiment of this invention.

FIG. 8 shows another cross-sectional view of the second preferred embodiment of this invention.

DETAILED DESCRIPTION OF THE PREFERRED EMBODIMENT

Figure 1:
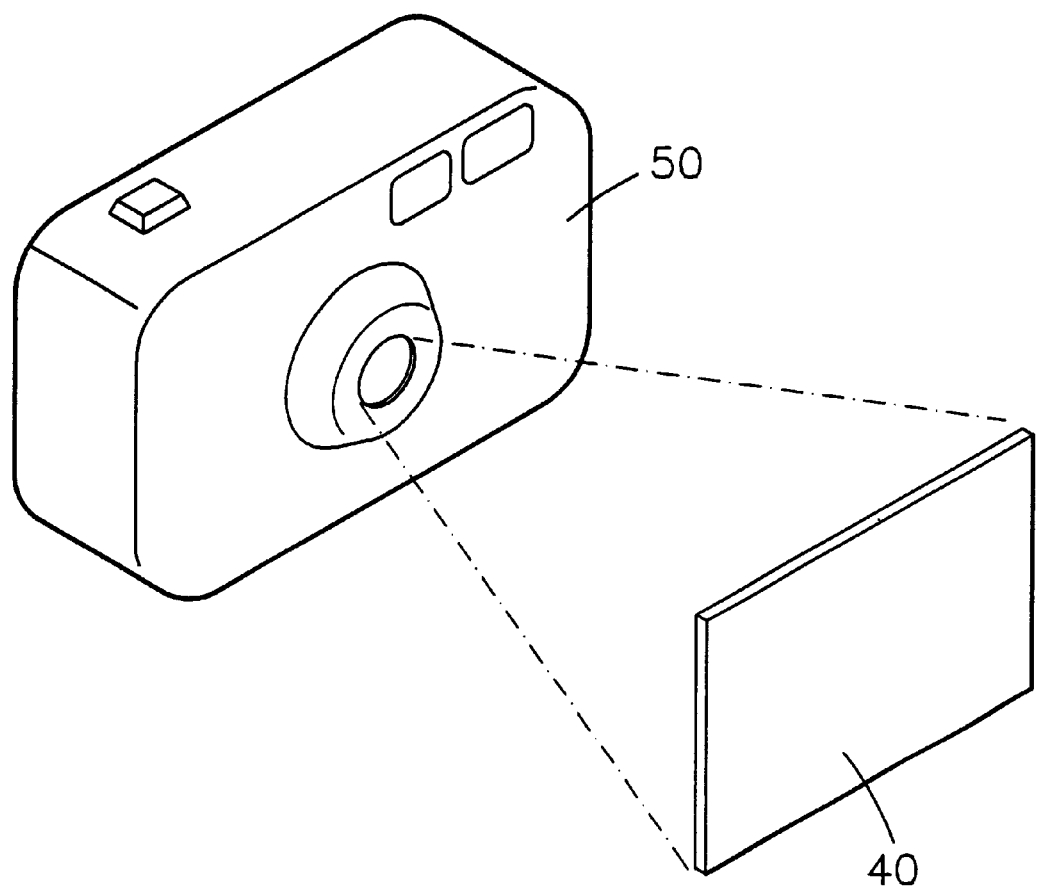
FIG. 1 shows a traditional digital camera for obtaining an image from a name card.
Figure 2:
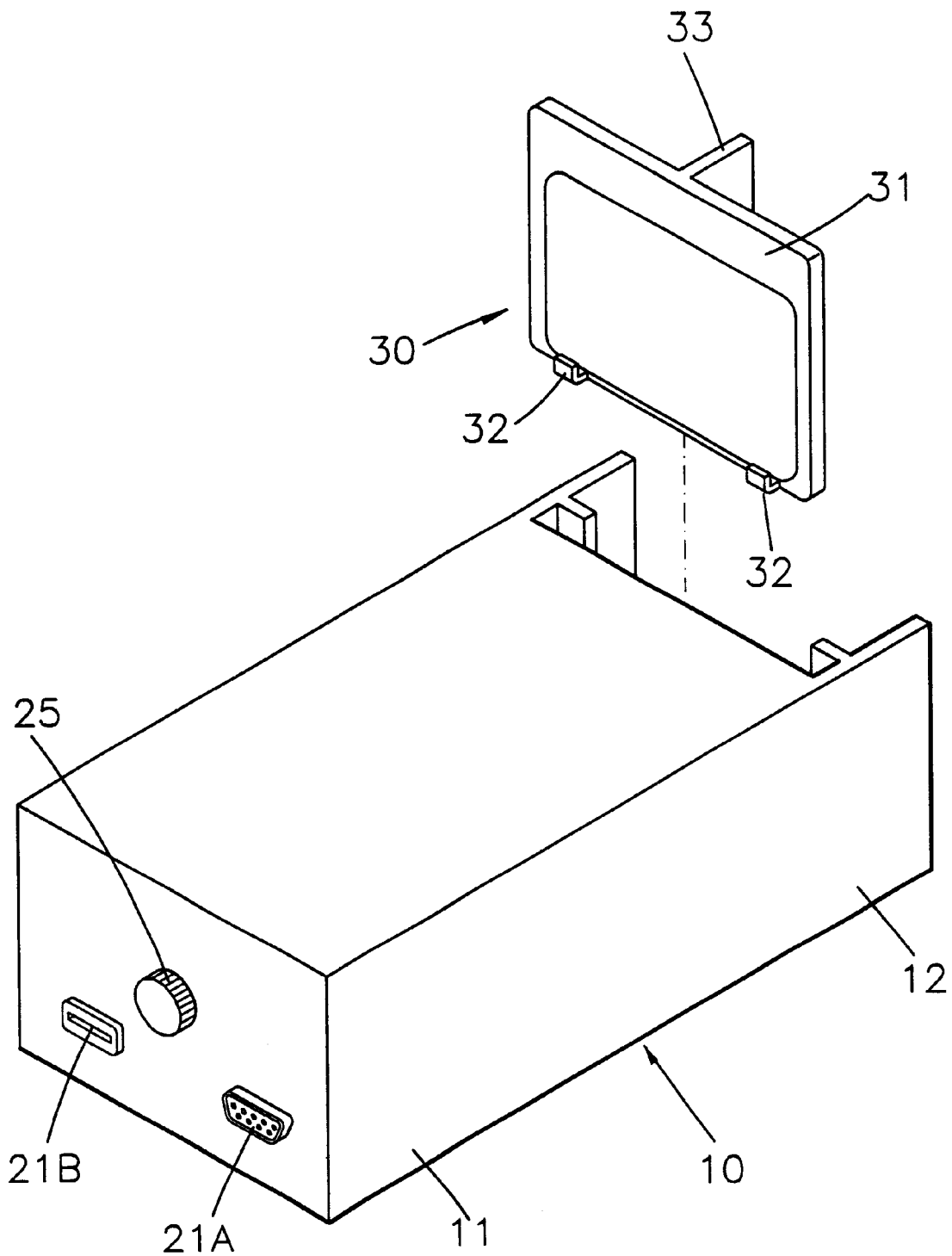
FIG. 2 is a perspective view of the present invention.
Figure 3:
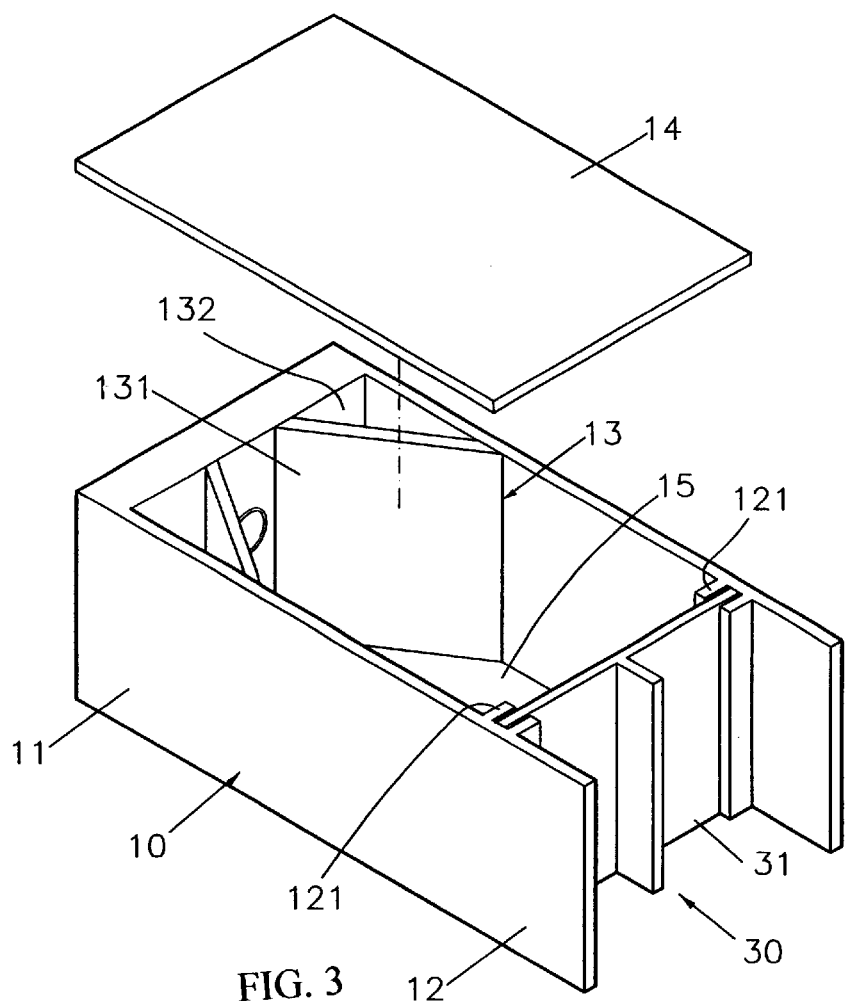
FIG. 3 is another perspective view showing the internal structure of the present invention.
Figure 4:
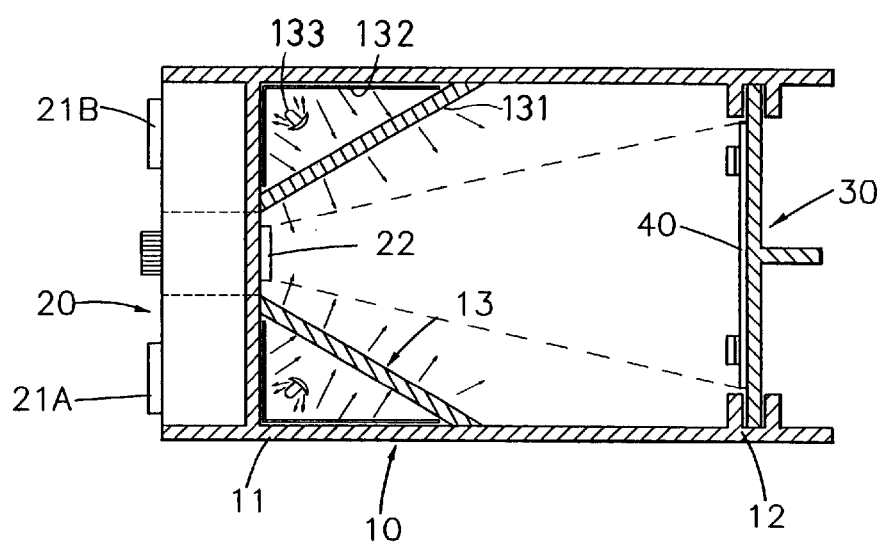
FIG. 4 is a cross-sectional view of the present invention.

Referring to FIGS. 2 to 4, it is the first preferred embodiment of the present invention "a name card image obtaining device." It mainly comprises a hollow housing 10, an image obtaining device 20 and a name card holding device 30.

The hollow housing 10 is a substantially horizontal long box. It has a first end 11 and an opposite second end 12. A pair of guiding slots 121 is disposed on the second end 12 of the hollow housing 10. Several homogeneous light generating sections 13 are disposed near the first end 11 of the hollow housing 10 so as to provide a pre-determined brightness at the second end 12. In this embodiment, the hollow housing 10 comprises a top plate 14, a bottom plate 15 and two lateral plates 16 for isolating external light. And, each of the homogeneous light generating devices 13 includes a light gathering portion 131, a reflecting portion 132 and a one-way light source 133. A light is projected from the one-way light source 133 and then is reflected by the reflecting portion 132 to the light gathering portion 131 so that the light gathering device 13 creates a substantially homogeneously light.

Figure 10:
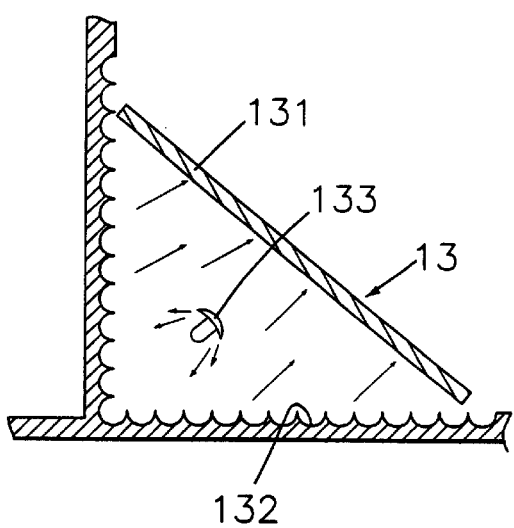
FIG. 10 a cross-sectional view showing another type of the reflecting section of this invention.

Of course the reflecting section 132 can be amended as a curved and smooth surface, as shown in FIG. 10.

The image obtaining device 20 is disposed on the first end 11 of the hollow housing 10. The image obtaining including 20 at least one connecting port 21A, 21B, such as a very common COM1 port 21A or a USB port 21B. Therefore, it will be quite convenient to connect with a personal computer, a notebook or other equipment.

The name card holding device 30 is disposed on the second end 12 of the hollow housing 10 so as to hold a name card 40 in a desired position inside the hollow housing 10. The name card holding device 30 includes a plate section 31, two name card fixing sections 32 and a holding section 33. Two lateral edges of said plate section 31 can be inserted into the guiding slots 121 of the hollow housing 10. In addition, these two name card fixing sections 32 are extended from a bottom edge of the plate section 31. The function of the holding section 33 is to allow a user to conveniently draw out or insert in the name card holding device 30.

Regarding the actual operation, first, the user's fingers hold on the holding section 33 and then lift up the name card holding device 30 out. Second, the user can put a name card 40 in the name card holding device 30. After which, the user inserts the name card holding device 40 back. Then, the user can start the image obtaining action. Because each homogeneous light generating device 13 includes a pair of sloped semi-transparent light gathering sections 131, a reflecting section 132 and a one-way light source 133. Thus, a light is initially projected from said light source 133 and then is reflected by said reflecting portion 132 to the light gathering portion 131 so that the light gathering device 13 creates a substantially homogeneously light. Therefore, there will be no concentrated light spots in the obtained name card image. Also, the brightness will be suitable and moderate.

Figure 5:
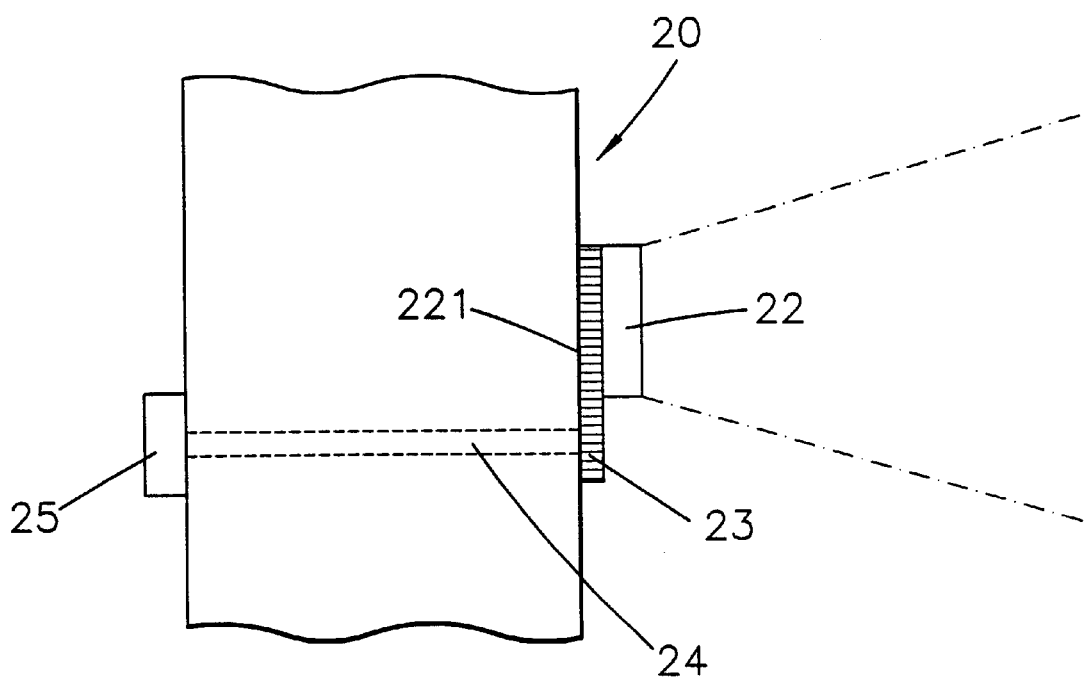
FIG. 5 is micro-adjustable focus mechanism of the present invention.

Referring to FIG. 5, this invention can further include a micro-adjustable focus mechanism. That is, the image obtaining device 20 further includes a focus-adjustable lens 22. The ring-shaped teeth 221 are disposed on a periphery of the lens 22 for gearing with a small gear 23. This small gear 23 has a shaft 24 integrally extended out an adjustable knob 25 so as to allow a user to micro-adjust the focus of the lens 22. So, when the focus is not right, the user can use this adjust the micro-adjusting focus mechanism to obtain a desired focus easily.

As shown in FIGS. 6 to 8, they show the second preferred embodiment of this invention. In which, the name card holding device 60 include a fixed plate section 61, a substantially L-shaped name card fixing section 62, a curved take-out recess 63 and a fissure 64. Therefore, a name card 40 can be inserted through the fissure 64 into the name card holding device 60. Also, because a corner of the name card 40 is protruded in the curved take-out recess 63, this name card 40 can be easily taken out by the user's fingers, and vice versa.

Figure 9:
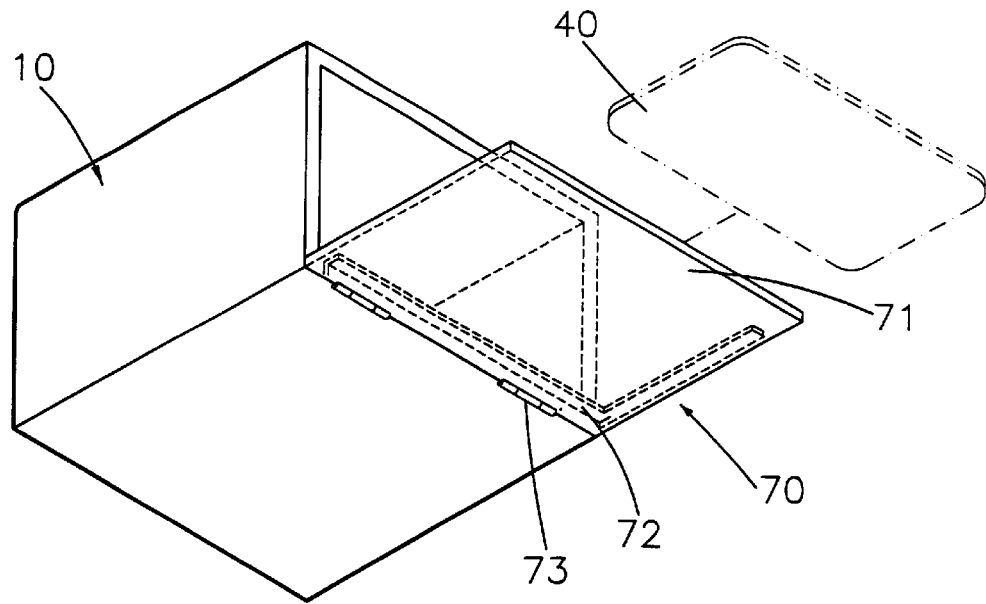
FIG. 9 shows the third preferred embodiment of this invention.

Furthermore, please refer to FIGS. 9 and 10. It is the third preferred embodiment of this invention. In which, the name card holding device 70 include a pivoted plate section 71, a substantially L-shaped name card fixing section 72, and a pivoting section 73. With regard to the substantially L-shaped name card fixing section 72, it only extended from the left and bottom edges so that it is suitable to hold a name card, which has a slightly larger or smaller length and width. Also, when the plate section 71 is rotated down, the name card 40 can be easily taken out or inserted in the name card holding device 70. Thus, it is very convenient. Besides, when the plate section 71 is rotated down, this invention can be used as a short-distance digital camera as a short-distance image obtaining equipment.

So, the advantages and functions of this invention can be summarized as follows:

(1) No concentrated sight spots problem in the name card image. Because light is initially projected from said light source 133 and then is reflected by said reflecting portion 132 to the light gathering portion 131 so that the light gathering device 13 creates a substantially homogeneously light. Therefore, there will be no concentrated light spots in the obtained name card image. Also, the brightness will be suitable and moderate. And, it will not be influenced by any external light sources.

(2) The focus is fixed but it can be micro-adjustable. Because the distance between the first end 11 and the second 12 of the hollow housing 10 is fixed. So, while obtaining a name card image, the focus and direction are always fixed. In addition, the focus can be micro-adjusted. Thus, it guarantees the focus is precisely correct.

(3) Easy of inserting/drawing name card. In this invention, the name card holding devices 30, 60, 70 are the sliding type, fixed type and pivot type respectively. So, the name card inserting/drawing operation is easy.

Finally, if the brightness of the light source 131 is dimmer enough, the light source 131 is not necessary to be a one-way light source 131. The light source 131 can be replaced by a regular lamp.

What is claimed is:

1. A name card image obtaining device, comprises:

a hollow housing having a first end and an opposite second end, one or several homogeneous light generating sections being disposed near the first end of said hollow housing so as to provide a pre-determined brightness at the second end;

an image obtaining device being disposed on the first end of the hollow housing, said image obtaining including at least one connecting port; and a name card holding device being disposed on the second end of the hollow housing so as to hold a name card in a desired position inside the hollow housing.

2. A name card image obtaining device as claimed in claim 1, wherein:

said hollow housing comprises a top plate, a bottom plate and two lateral plates for isolating external light; and each of said homogeneous light generating devices includes a light gathering portion, a reflecting portion and a light source, a light being initially projected from said light source and then is reflected by said reflecting portion to said light gathering portion so that the light gathering device creates a substantially homogeneous light.

3. A name card image obtaining device as claimed in claim 1, wherein:

a pair of guiding slots is disposed on the second end of said hollow housing; and said name card holding device includes a plate section, one or more name card fixing sections and a holding sections, two lateral edges of said plate section can be inserted into the guiding slots of the hollow housing, said name card fixing sections being extended from a bottom edge of said plate section, the function of said holding section being to allow a user to conveniently draw out or insert in said name card holding device.

4. A name card image obtaining device as claimed in claim 1, wherein:

said name card holding device include a fixed plate section, a substantially L-shaped name card fixing section, a curved take-out recess and a fissure.

5. A name card image obtaining device as claimed in claim 1, wherein:

said name card holding device includes a pivoted plate section, a substantially L-shaped name card fixing section, and a pivoting section.

6. A name card image obtaining device as claimed in claim 1, wherein:

said image obtaining device further includes a focus-adjustable lens, a ring-shaped teeth being disposed on a periphery of the lens for gearing with a small gear, said small gear having a shaft integrally extended out an adjustable knob so as to allow a user to micro-adjust a focus of the lens.

* * * * *